(12) United States Patent
Haritaoglu et al.

(10) Patent No.: US 11,647,237 B1
(45) Date of Patent: *May 9, 2023

(54) METHOD AND APPARATUS FOR SECURE VIDEO MANIFEST/PLAYLIST GENERATION AND PLAYBACK

(71) Applicant: Google LLC, Mountain View, CA (US)

(72) Inventors: Ismail R. Haritaoglu, Palo Alto, CA (US); Oztan Harmanci, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/347,535

(22) Filed: Jun. 14, 2021

Related U.S. Application Data

(63) Continuation of application No. 15/589,756, filed on May 8, 2017, now Pat. No. 11,039,181.

(Continued)

(51) Int. Cl.
*H04N 7/167* (2011.01)
*H04N 21/2347* (2011.01)
(Continued)

(52) U.S. Cl.
CPC ..... *H04N 21/2347* (2013.01); *H04N 21/2351* (2013.01); *H04N 21/2387* (2013.01); *H04N 21/4353* (2013.01)

(58) Field of Classification Search
CPC .......... H04N 21/2347; H04N 21/2351; H04N 21/2387; H04N 21/4353
(Continued)

(56) References Cited

U.S. PATENT DOCUMENTS

| 5,442,744 A | 8/1995 | Piech et al. |
| 5,513,260 A | 4/1996 | Ryan |

(Continued)

FOREIGN PATENT DOCUMENTS

| CN | 101325687 A | 12/2008 |
| CN | 101356820 A | 1/2009 |

(Continued)

OTHER PUBLICATIONS

Chinese Patent Application No. 201780011291.6, Office Action dated Sep. 29, 2021, 22 pages.

(Continued)

*Primary Examiner* — Jefferey F Harold
*Assistant Examiner* — Sahar Aqil Riaz
(74) *Attorney, Agent, or Firm* — Lowenstein Sandler LLP

(57) ABSTRACT

A method to provide secure delivery of a manifest file for use in playback of a video signal on a video player. The method includes establishing a connection with the video player, wherein the connection has a session identifier identifying the connection with the video player, receiving a request from the video player for the video signal, wherein the video signal is associated with the manifest file created for the video signal, customizing, using the session identifier identifying the connection with the video player, the manifest file created for the video player to provide a customized manifest file that is unique to the video player, the customized manifest file to be used in playback of the video signal on the video player, encrypting the customized manifest file using a manifest encryption key which is based on the session identifier identifying the connection with the video player, and transmitting the encrypted manifest file to the video player.

23 Claims, 3 Drawing Sheets

Related U.S. Application Data

(60) Provisional application No. 62/333,377, filed on May 9, 2016.

(51) Int. Cl.
    *H04N 21/235* (2011.01)
    *H04N 21/2387* (2011.01)
    *H04N 21/435* (2011.01)

(58) Field of Classification Search
    USPC .......................................................... 725/31
    See application file for complete search history.

(56) References Cited

U.S. PATENT DOCUMENTS

| | | | |
|---|---|---|---|
| 5,577,135 | A | 11/1996 | Grajski et al. |
| 5,659,613 | A | 8/1997 | Copeland |
| 5,668,603 | A | 9/1997 | Copeland |
| 5,721,788 | A | 2/1998 | Powell |
| 5,883,959 | A | 3/1999 | Kori |
| 5,917,943 | A | 6/1999 | Washizawa |
| 6,018,374 | A | 1/2000 | Wrobleski |
| 6,026,189 | A | 2/2000 | Greenspan |
| 6,173,275 | B1 | 1/2001 | Caid et al. |
| 6,373,960 | B1 | 4/2002 | Conover et al. |
| 6,381,367 | B1 | 4/2002 | Ryan |
| 6,404,925 | B1 | 6/2002 | Foote et al. |
| 6,438,275 | B1 | 8/2002 | Martins et al. |
| 6,539,395 | B1 | 3/2003 | Gjerdingen et al. |
| 6,711,293 | B1 | 3/2004 | Lowe |
| 6,774,917 | B1 | 8/2004 | Foote et al. |
| 6,785,815 | B1 | 8/2004 | Serret-Avila et al. |
| 6,937,766 | B1 | 8/2005 | Wilf et al. |
| 6,975,746 | B2 | 12/2005 | Davis et al. |
| 6,975,755 | B1 | 12/2005 | Baumberg |
| 7,043,019 | B2 | 5/2006 | Tehranchi et al. |
| 7,055,169 | B2 | 5/2006 | Delpuch et al. |
| 7,167,574 | B2 | 1/2007 | Kim |
| 7,177,470 | B2 | 2/2007 | Jasinschi et al. |
| 7,185,201 | B2 | 2/2007 | Rhoads et al. |
| 7,218,754 | B2 | 5/2007 | Schumann et al. |
| 7,272,240 | B2 | 9/2007 | Goldberg et al. |
| 7,298,930 | B1 | 11/2007 | Erol et al. |
| 7,325,013 | B2 | 1/2008 | Caruso |
| 7,421,376 | B1 | 9/2008 | Caruso et al. |
| 7,650,361 | B1 | 1/2010 | Wong et al. |
| 8,099,508 | B2 | 1/2012 | Mao et al. |
| 8,160,366 | B2 | 4/2012 | Nakamura et al. |
| 8,200,021 | B2 | 6/2012 | Iwamoto et al. |
| 8,234,350 | B1 | 7/2012 | Gu et al. |
| 8,515,212 | B1 | 8/2013 | Bengio et al. |
| 8,515,241 | B2 | 8/2013 | Forsyth et al. |
| 8,607,283 | B2 | 12/2013 | Civanlar et al. |
| 8,677,428 | B2* | 3/2014 | Lewis ............ H04N 21/44016 725/91 |
| 8,887,215 | B2 | 11/2014 | Fisher |
| 8,943,215 | B2 | 1/2015 | Patten et al. |
| 9,015,151 | B1 | 4/2015 | Margulis et al. |
| 9,066,115 | B1 | 6/2015 | Cherry et al. |
| 9,066,138 | B1 | 6/2015 | Kraiman et al. |
| 9,084,030 | B1 | 7/2015 | Nijim et al. |
| 9,167,278 | B2 | 10/2015 | Sinha et al. |
| 9,448,619 | B1 | 9/2016 | Kerns |
| 9,491,499 | B2 | 11/2016 | Wagenaar et al. |
| 9,552,356 | B1 | 1/2017 | Edwards |
| 9,613,042 | B1 | 4/2017 | Joseph et al. |
| 9,654,817 | B2 | 5/2017 | Li et al. |
| 10,104,137 | B2* | 10/2018 | Salomons .......... H04N 21/2662 |
| 10,148,716 | B1 | 12/2018 | Joseph et al. |
| 10,306,208 | B2* | 5/2019 | Hosea ................ H04N 13/218 |
| 10,595,054 | B2 | 3/2020 | Turgut et al. |
| 10,785,508 | B2 | 9/2020 | Haritaoglu et al. |
| 2002/0159641 | A1 | 10/2002 | Whitney et al. |
| 2002/0178447 | A1 | 11/2002 | Plotnick et al. |
| 2003/0005454 | A1 | 1/2003 | Rodriguez et al. |
| 2003/0033347 | A1 | 2/2003 | Bolle et al. |
| 2003/0045954 | A1 | 3/2003 | Weare et al. |
| 2003/0151621 | A1 | 8/2003 | McEvilly |
| 2003/0195883 | A1 | 10/2003 | Mojsilovic et al. |
| 2003/0229900 | A1 | 12/2003 | Reisman |
| 2004/0022447 | A1 | 2/2004 | Mukhopadhyay et al. |
| 2004/0085339 | A1 | 5/2004 | Divakaran et al. |
| 2004/0221237 | A1 | 11/2004 | Foote et al. |
| 2004/0260786 | A1 | 12/2004 | Barile |
| 2005/0041159 | A1 | 2/2005 | Nakamura et al. |
| 2005/0125368 | A1 | 6/2005 | Akahori |
| 2005/0251532 | A1 | 11/2005 | Radhakrishnan et al. |
| 2005/0262245 | A1 | 11/2005 | Menon et al. |
| 2005/0278736 | A1 | 12/2005 | Steelberg et al. |
| 2005/0289347 | A1 | 12/2005 | Ovadia |
| 2006/0029253 | A1 | 2/2006 | Pace |
| 2006/0101060 | A1 | 5/2006 | Li et al. |
| 2006/0111801 | A1 | 5/2006 | Weare et al. |
| 2006/0271973 | A1 | 11/2006 | Jerding et al. |
| 2006/0279628 | A1 | 12/2006 | Fleming |
| 2006/0291690 | A1 | 12/2006 | Roberts |
| 2007/0025606 | A1 | 2/2007 | Gholap et al. |
| 2007/0121997 | A1 | 5/2007 | Harmanci |
| 2007/0128899 | A1 | 6/2007 | Mayer |
| 2007/0143493 | A1 | 6/2007 | Mullig et al. |
| 2007/0157231 | A1 | 7/2007 | Eldering et al. |
| 2007/0171580 | A1 | 7/2007 | Nishimura |
| 2007/0180466 | A1 | 8/2007 | Ando et al. |
| 2007/0217676 | A1 | 9/2007 | Grauman et al. |
| 2007/0253594 | A1 | 11/2007 | Lu et al. |
| 2007/0282898 | A1 | 12/2007 | Stark et al. |
| 2008/0027931 | A1 | 1/2008 | Lu et al. |
| 2008/0040807 | A1 | 2/2008 | Lu et al. |
| 2008/0123976 | A1 | 5/2008 | Coombs et al. |
| 2008/0166057 | A1 | 7/2008 | Nakajima |
| 2008/0186413 | A1 | 8/2008 | Someya et al. |
| 2008/0271080 | A1 | 10/2008 | Gossweiler et al. |
| 2009/0074235 | A1 | 3/2009 | Lahr et al. |
| 2009/0089838 | A1 | 4/2009 | Pino, Jr. et al. |
| 2009/0113512 | A1 | 4/2009 | Collet et al. |
| 2009/0193473 | A1 | 7/2009 | Moon et al. |
| 2009/0204901 | A1 | 8/2009 | Dharmaji et al. |
| 2009/0324026 | A1 | 12/2009 | Kletter |
| 2010/0138865 | A1 | 6/2010 | Rai et al. |
| 2010/0162330 | A1 | 6/2010 | Herlein et al. |
| 2010/0299438 | A1 | 11/2010 | Zimmerman et al. |
| 2011/0078551 | A1 | 3/2011 | Zhang et al. |
| 2011/0191692 | A1 | 8/2011 | Walsh et al. |
| 2011/0219035 | A1 | 9/2011 | Korsunsky et al. |
| 2011/0314493 | A1 | 12/2011 | Lemire et al. |
| 2012/0089910 | A1 | 4/2012 | Cassidy |
| 2012/0159337 | A1 | 6/2012 | Travilla et al. |
| 2012/0166289 | A1 | 6/2012 | Gadoury |
| 2012/0216121 | A1 | 8/2012 | Lin et al. |
| 2012/0240176 | A1 | 9/2012 | Ma et al. |
| 2012/0275597 | A1* | 11/2012 | Knox ................ H04N 21/8456 380/210 |
| 2012/0278725 | A1 | 11/2012 | Gordon et al. |
| 2013/0060911 | A1 | 3/2013 | Nagaraj et al. |
| 2013/0163758 | A1 | 6/2013 | Swaminathan et al. |
| 2013/0195204 | A1 | 8/2013 | Reznik et al. |
| 2013/0219178 | A1 | 8/2013 | Xiques et al. |
| 2013/0219425 | A1 | 8/2013 | Swartz |
| 2013/0227074 | A1 | 8/2013 | Odlund |
| 2013/0291002 | A1 | 10/2013 | Rothschild et al. |
| 2013/0311780 | A1* | 11/2013 | Besehanic .......... H04L 63/0428 713/176 |
| 2014/0029922 | A1 | 1/2014 | Goldfeder et al. |
| 2014/0095890 | A1 | 4/2014 | Mangalore et al. |
| 2014/0115060 | A1 | 4/2014 | Kim et al. |
| 2014/0136661 | A1 | 5/2014 | Handa |
| 2014/0173660 | A1 | 6/2014 | Correa et al. |
| 2014/0176299 | A1 | 6/2014 | Kumar et al. |
| 2014/0181656 | A1 | 6/2014 | Kumar et al. |
| 2014/0201334 | A1 | 7/2014 | Wang et al. |
| 2014/0259051 | A1 | 9/2014 | Strein et al. |
| 2014/0280781 | A1 | 9/2014 | Gregotski |
| 2014/0282772 | A1 | 9/2014 | Chen et al. |
| 2014/0337904 | A1 | 11/2014 | Panje et al. |

(56) References Cited

U.S. PATENT DOCUMENTS

| | | |
|---|---|---|
| 2015/0058709 A1 | 2/2015 | Zaletel |
| 2015/0074232 A1 | 3/2015 | Phillips et al. |
| 2015/0113021 A1 | 4/2015 | Martin |
| 2015/0172342 A1* | 6/2015 | Yin .................... H04L 65/1089 709/203 |
| 2015/0208103 A1 | 7/2015 | Guntur et al. |
| 2015/0312299 A1 | 10/2015 | Chen |
| 2015/0346832 A1 | 12/2015 | Cole et al. |
| 2015/0365622 A1 | 12/2015 | Ushiyama |
| 2015/0365725 A1 | 12/2015 | Belyaev et al. |
| 2015/0382042 A1 | 12/2015 | Wagenaar et al. |
| 2016/0065946 A1 | 3/2016 | Cole et al. |
| 2016/0080470 A1 | 3/2016 | Shanson |
| 2016/0080810 A1 | 3/2016 | Dutta et al. |
| 2016/0127260 A1 | 5/2016 | Gordon |
| 2016/0127440 A1* | 5/2016 | Gordon .............. H04N 21/2402 709/219 |
| 2016/0134910 A1 | 5/2016 | Davis et al. |
| 2016/0149699 A1* | 5/2016 | Gauda ................ H04L 63/0428 713/168 |
| 2016/0173961 A1 | 6/2016 | Coan et al. |
| 2016/0198202 A1 | 7/2016 | Van Brandenburg et al. |
| 2016/0224799 A1 | 8/2016 | Uzun et al. |
| 2016/0227228 A1 | 8/2016 | Pomeroy et al. |
| 2016/0227279 A1 | 8/2016 | Fang et al. |
| 2016/0316233 A1 | 10/2016 | Ghadi et al. |
| 2016/0328396 A1 | 11/2016 | Rajapakse |
| 2016/0337704 A1 | 11/2016 | Binder et al. |
| 2017/0024098 A1 | 1/2017 | Doherty |
| 2017/0064400 A1 | 3/2017 | Riegel et al. |
| 2017/0070758 A1 | 3/2017 | Phillips et al. |
| 2017/0085933 A1 | 3/2017 | Czeck, Jr. et al. |
| 2017/0148057 A1 | 5/2017 | Parameshwar |
| 2017/0150190 A1 | 5/2017 | Tarbox et al. |
| 2017/0155973 A1 | 6/2017 | Muller |
| 2017/0171580 A1 | 6/2017 | Hirsch et al. |
| 2017/0280181 A1* | 9/2017 | Ramaley ............ H04N 21/6373 |
| 2017/0302753 A1 | 10/2017 | Larumbe et al. |
| 2017/0308681 A1 | 10/2017 | Gould et al. |
| 2017/0353516 A1 | 12/2017 | Gordon |
| 2018/0063594 A1 | 3/2018 | Alexander et al. |
| 2018/0139507 A1 | 5/2018 | Toksoz et al. |

FOREIGN PATENT DOCUMENTS

| | | |
|---|---|---|
| CN | 101589617 A | 11/2009 |
| CN | 101689184 A | 3/2010 |
| CN | 103155571 A | 6/2013 |
| CN | 103491457 A | 1/2014 |
| JP | 3916025 B2 | 5/2007 |
| JP | 4150951 B2 | 9/2008 |
| WO | 2006122320 A2 | 11/2006 |
| WO | 2007148290 A2 | 12/2007 |
| WO | 2015148513 A1 | 10/2015 |

OTHER PUBLICATIONS

International Search Report for PCT Patent Application No. PCT/US17/31991 dated Sep. 21, 2017, 21 pages.

International Search Report for PCT Patent Application No. PCT/US2017/032015 dated Aug. 4, 2017, 11 pages.

International Search Report and the Written Opinion for International Application No. PCT/US2017/032966, dated Jul. 3, 2017, 6 pages.

Supplementary European Extended Search Report and the European Search Opinion: European Application No. 09801114, dated Apr. 10, 2012, 8 pages.

D. G. Lowe, "Object Recognition from Local Scale-Invariant Features", in International Conference on Computer Vision, vol. 2, 1999, pp. 1-8.

K. Mihcak and R. Venkatesan, "Blind Image Watermarking Via Derivation and Quantization of Robust Semi-Global Statistics", in IEEE International Conference on Acoustics, Speech and Signal Processing, 2002, (4 pages).

T. Lindeberg, "Feature Detection with Automatic Scale Selection", International Journal of Computer Vision, vol. 30, No. 2, 1998, pp. 1-51.

A. Andoni and P. Indyk, "Near-Optimal Hashing Algorithms for Approximate Nearest Neighbor in High Dimensions", in Proceedings of the Symposium on Foundations of Computer Science, Jan. 2006, 10 pages.

A. Joly, O. Buisson and C. Frelicot, "Content-based Retrieval using Distortion-based Probabilistic Similarity Search", IEEE Transactions on Multimedia, vol. 9, No. 2, p. 1-14, Feb. 2007.

J. Matas, O. Chum, M. Urban, T. Pajdla, "Robust Wide Baseline Stereo from Maximally Stable Extremal Regions", in British Machine Vision Conference., 2002, pp. 384-393.

K. Mikolajczyk and C. Schmid, "Indexing based on scale invariant interest points", in Proc. ICCV, 2001, 7 pages.

Chinese Patent Application No. 201780011326.6, Office Action dated Mar. 9, 2020, 6 pages.

Chinese Patent Application No. 201780011328.5, Office Action dated Mar. 9, 2020, 8 pages.

Partial European search report for European Patent Application No. 22174193.7, dated Sep. 9, 2022, 16 pages.

\* cited by examiner

```
#EXTM3U
#EXT-X-STREAM-INF:PROGRAM-ID=1,BANDWIDTH=1326000
http://12.34.56.789/server/play/directory/1326000/prog.m3u8
#EXT-X-STREAM-INF:PROGRAM-ID=1,BANDWIDTH=826000
http://12.34.56.789/server/play/directory/826000/prog.m3u8
#EXT-X-STREAM-INF:PROGRAM-ID=1,BANDWIDTH=1926000
http://12.34.56.789/server/play/directory/1926000/prog.m3u8
#EXT-X-STREAM-INF:PROGRAM-ID=1,BANDWIDTH=526000
http://12.34.56.789/server/play/directory/526000/prog.m3u8
```

FIG. 3

```
#EXTM3U
#EXT-X-TARGETDURATION:10
#EXT-X-VERSION:5
#EXT-X-MEDIA-SEQUENCE:1
#EXT-X-KEY:METHOD=SAMPLE-AES,URI="http://www.server.com/keys/ckey/kuxeFdrW8knwGPJ7zDlJ6Q===?anvack=nbcu_n
bcd_watchvod_ios_qa_c23d2809ee27249f2a757537da68d17d",IV=0xE0F48617C65F9D00ACC4B47D0EDE94B5
#EXTINF:12.512,
http://www.videolocation.com/2288/15/04/24/2861607/227C1D636AE412B0A9CD90ECB9B899BD6A7631282DBF7E-1.ts
#EXT-X-KEY:METHOD=SAMPLE-AES,URI="http://www.server.com/keys/ckey/kuxeFdrW8knwGPJ7zDlJ6Q===?anvack=nbcu_nbcd_wa
tchvod_ios_qa_c23d2809ee27249f2a757537da68d17d",IV=0x24BCA9ACCEFA864BFEC75CBED36D47C8
#EXTINF:12.512,
http://www.videolocation.com/2288/15/04/24/2861607/227C1D636AE412B0A9CD90ECB9B899BD6A7631282DBF7E-2.ts
#EXT-X-KEY:METHOD=SAMPLE-AES,URI="http://www.server.com/keys/ckey/kuxeFdrW8knwGPJ7zDlJ6Q===?anvack=nbcu_nbcd_wa
tchvod_ios_qa_c23d2809ee27249f2a757537da68d17d",IV=0x6C29CA3D305C63ACEBB7A06EBE3573F7
#EXTINF:12.513,
http://www.videolocation.com/2288/15/04/24/2861607/227C1D636AE412B0A9CD90ECB9B899BD6A7631282DBF7E-3.ts
#EXT-X-KEY:METHOD=SAMPLE-AES,URI="http://www.server.com/keys/ckeys/kuxeFdrW8knwGPJ7zDlJ6Q===?anvack=nbcu_nbcd_wa
tchvod_ios_qa_c23d2809ee27249f2a757537da68d17d",IV=0xC8BDB892FDE40BD0C167C3F10B5D8699
#EXTINF:12.512,
http://www.videolocation.com/2288/15/04/24/2861607/227C1D636AE412B0A9CD90ECB9B899BD6A7631282DBF7E-4.ts
#EXT-X-KEY:METHOD=SAMPLE-AES,URI="http://www.server.com/keys/ckey/kuxeFdrW8knwGPJ7zDlJ6Q===?anvack=nbcu_nbcd_wa
tchvod_ios_qa_c23d2809ee27249f2a757537da68d17d",IV=0x3F9FCC1E55D85CFE32C18BA73992181D
#EXTINF:12.513,
http://www.videolocation.com/2288/15/04/24/2861607/227C1D636AE412B0A9CD90ECB9B899BD6A7631282DBF7E-5.ts
```

FIG. 4

```
#EXTM3U
#EXT-X-ANVATO-VARIANT-SEC:KEYREF=NHTy5BpR5GyZsa8PnrEtkw,data=H1o3wxJDNPf3bv6zkrjxglr76QFrkrlOuwOp
P6jOy/SCwtBR56D5WJ9iFelkfHv6Mz8U61DiD317g2+eKFmXUGybd+zmO4z0GYBbcg5YSTspT8w1ORFCqb+h+NTHyaDLv4
osaNid7YRhZVTjnSkPDA+178kSCV81ycZt0euF/WXqaMtg4OXcQhe/Cgn4ZavPtgj30nWQph7AM8mDJkVWCuryar/aX55o6
SuRw9r58x8srtA914vP2sdbrYz2FVJ/7gJtvPAeGRxgYqL7/tJJ3T5gipkM1gKqPrGg1N2oNawWJ9iFelkfHv6Mz8U61DiD317g2+
eKFmXUGybd+zmO4z0GYBbcg5YSTspT8w1ORFCqb+h+NTHyaDLv4osaNid7YRhZVTjnSkPDA+178kSCV81ycZt0euF/WX
qaMtg4OXcQhe/Cgn4ZavPtgj30nWQph7AM8mDJkVWCuryar/aX55o6SuRw9r58x8srtA914vP2sdbrYz2FVJ/7gJtvPAeGRxgY
qL7/tJJ3T5gipkM1gKqPrGg1N2oNaw
```

FIG. 5

# METHOD AND APPARATUS FOR SECURE VIDEO MANIFEST/PLAYLIST GENERATION AND PLAYBACK

CROSS-REFERENCE TO RELATED APPLICATIONS

This application is a continuation application of co-pending U.S. patent application Ser. No. 15/589,756, filed May 8, 2017, which claims priority to U.S. Provisional Application No. 62/333,377, filed May 9, 2016, the entire contents of which are incorporated herein by reference.

BACKGROUND

The subject matter disclosed herein relates to a method of secure delivery of video manifest files for use during video streaming. More specifically, a method and apparatus for generating single use, per-user encryption keys to encrypt a manifest file for use during video streaming is disclosed.

Video streaming allows video content to be delivered to a video player via the internet. The video content is a video signal generated by a content provider for distribution to video consumers. The video signal may be provided in an uncompressed file format, such as a serial digital interface (SDI) format, or in a compressed format, such as a Moving Picture Experts Group (MPEG) file format or Transport Stream (TS) file format. The video signal is sent to an encoder which converts the file into a live streaming signal. The live streaming signal is preferably a segmented data stream that may be transmitted using standard Hypertext Transport Protocol (HTTP) over the internet. The live streaming signal may include multiple streams, where each stream may have a different data rate and/or different resolution.

Two common formats for the live streaming signal include HTTP Live Streaming (HLS) implemented by Apple® and MPEG-Dynamic Adaptive bitrate Streaming over HTTP (MPEG-DASH) implemented, for example, by web browsers such as Chrome®, Microsoft Edge®, and Firefox®. In addition to the segmented data stream, the encoder generates a manifest file. The manifest file contains information for a video player to play the segmented data stream such as the data rate and resolution of each stream and a playlist providing an address from which the video content may be retrieved. Historically, the encoder has generated a single manifest file for each encoded video signal, where the manifest file is distributed along with the streaming signal.

The live streaming signal and the manifest file are stored in one or more Content Delivery Networks (CDN). Each CDN includes a number of edge servers which store the streaming signal and manifest file until requested by a video player. When the streaming signal is provided to multiple CDNs, the CDNs may be in different geographic locations, such as the West Coast, East Coast, or Midwest. Each video player may select a CDN based, among other things, on its geographic proximity in order to reduce transmission latencies.

The video player may be any suitable electronic device to receive the streaming signal such as a desktop computer, a television, a laptop computer, a tablet, or a mobile phone. A user initiates a request to view desired video content on the video player. The video player includes video management software executing on the video player which has knowledge of the address of the CDN and which may provide a list of video content stored on the CDN to the user. After the user has selected a desired video, the video player, in turn, requests that the video content be transmitted from the CDN.

The streaming video content is commonly encrypted prior to transmission. A standard encryption protocol, such as the Advanced Encryption Standard (AES) may be used. During encoding of the video signal, the encoder may communicate with a key server to obtain an encryption key for the video content and encrypt the video signal as part of the encoding process. The encoder may include the location of the encryption key in the manifest file for the encoded video content and provide the manifest file to the CDN. The manifest file is delivered to the video player when the video content is requested. The video player reads the location of the encryption key from the manifest file, retrieves the encryption key, and decrypts the video content on the player prior to displaying the video content to the user.

Although the video content is encrypted, the manifest file is a standard text file and is easily readable by any device. As previously indicated, a single manifest file has typically been generated for each encoded video signal, and the same manifest file has been delivered to every video player requesting the encoded video signal. However, recent advances in streaming video signals have resulted in separate manifest files being generated for each video player. The separate manifest files may provide unique directions to each video player for video playback. Further, the separate manifest files may include information, such as a network address, unique to the video player to which it is being provided. Thus, it is desirable to provide a method for secure delivery of the manifest file to each video player.

BRIEF DESCRIPTION

The subject matter disclosed herein describes an apparatus and method for secure delivery of unique manifest files to each video player. A single use, per-user encryption key to encrypt the video manifest/playlist file is disclosed. A video player generates a session ID when establishing connection with a manifest server. The manifest server is in communication with a key server and uses the session ID and content ID to generate the single use encryption key specifically for the session ID generated by the video player. The manifest server encrypts the manifest file prior to providing it to the video player. The content of the manifest file can then only be decrypted by the single use encryption key. The video player communicates with the key server to retrieve the single use key and to decrypt the manifest file.

According to one embodiment, a method for secure delivery of a manifest file for use in playback of a video signal on a video player is disclosed. A connection is established between a manifest server and the video player, and the connection has a session identifier. A request is received at the manifest server from the video player for the video signal. A manifest encryption key is generated as a function of the session identifier, and a manifest file corresponding to the requested video signal is encrypted. The manifest server uses the manifest encryption key to encrypt the manifest file. The encrypted manifest file is transmitted from the manifest server to the video player.

According to another aspect of the disclosure, the manifest file may be retrieved from a content delivery network after receiving the request for the video signal from the video player. The manifest server may also receive an indication of the presence of an enhanced video player module loaded on the video player and encrypt the manifest file without inserting an address of the manifest key. Alternately, if the manifest server receives the request for the video signal without receiving an indication of the presence of an enhanced video player module loaded on the video player, the manifest server may edit the encrypted manifest file to include an unencrypted address of the manifest key.

According to still another aspect of the disclosure, establishing the connection between the manifest server and the video player may include receiving an initiate connection request from the video player, generating the session identifier corresponding to the connection between the video player and the manifest server on the manifest server, and sending an acknowledgement of the connection request to the video player. Alternately, the video player generates the session identifier, where the session identifier corresponds to the requested video signal, and the manifest server receives the session identifier from the video player.

According to another embodiment of the disclosure, a system for secure delivery of a manifest file for use in playback of a video signal on a video player is disclosed. The system includes a manifest server having a non-transitory storage and a processor operative to execute a plurality of instructions stored on the non-transitory storage. The instructions are executed to establish a connection between the manifest server and the video player, where the connection has a session identifier; receive at the manifest server from the video player for the video signal; generate a manifest encryption key as a function of the session identifier; encrypt a manifest file corresponding to the requested video signal, where the manifest server uses the manifest encryption key to encrypt the manifest file; and transmit the encrypted manifest file from the manifest server to the video player.

According to yet another embodiment of the disclosure, a method for secure delivery of a manifest file for use in playback of a video signal on a video player is disclosed. A connection is established between a manifest server and the video player, and the connection has a session identifier. A request for the video signal is transmitted from the video player to the manifest server, and an encrypted manifest file, corresponding to the requested video signal from the manifest server, is received at the video player. The manifest file is encrypted by the manifest server for the connection as a function of a manifest encryption key, and the manifest encryption key is generated as a function of the session identifier. The manifest file is decrypted on the video player as a function of the manifest encryption key.

According to still other aspects of the disclosure, an indication of the presence of an enhanced video player module loaded on the video player may be transmitted from the video player to the manifest server. Decrypting the manifest file may include generating a duplicate manifest encryption key on the video player with the enhanced video player module and decrypting the manifest file with the enhanced video player module using the duplicate manifest encryption key. Alternately, decrypting the manifest file may include reading an address for the manifest encryption key from the manifest file, where the manifest server has inserted the address into the manifest file, retrieving a copy of the manifest encryption key from the address in the manifest file, and decrypting the manifest file on the video player using the copy of the manifest encryption key.

According to still another embodiment of the disclosure, a system for secure delivery of a manifest file for use in playback of a video signal on a video player is disclosed. The system includes an enhanced video player module stored in a non-transitory memory on the video player. The enhanced video player module is operative to establish a connection between a manifest server and the video player, where the connection has a session identifier. A request for the video signal is transmitted from the video player to the manifest server, and an encrypted manifest file corresponding to the requested video signal is received from the manifest server. The manifest file is encrypted by the manifest server for the connection as a function of a manifest encryption key, and the manifest encryption key is generated as a function of the session identifier. The manifest file is decrypted on the video player as a function of the manifest encryption key.

These and other objects, advantages, and features of the disclosure will become apparent to those skilled in the art from the detailed description and the accompanying drawings. It should be understood, however, that the detailed description and accompanying drawings, while indicating various embodiments of the present disclosure, are given by way of illustration and not of limitation. Many changes and modifications may be made within the scope of the present disclosure without departing from the spirit thereof, and the disclosure includes all such modifications.

BRIEF DESCRIPTION OF THE DRAWING(S)

Various embodiments of the subject matter disclosed herein are illustrated in the accompanying drawings in which like reference numerals represent like parts throughout, and in which:

FIG. 3 is a segment of a manifest file describing the bandwidths of the available streams for the streaming video content and the location of each stream;

FIG. 4 is a segment of a manifest file including a portion of a playlist where the video content is encrypted; and FIG. 5 is an encrypted manifest file including the encryption key according to one embodiment of the disclosure.

Figure 1:
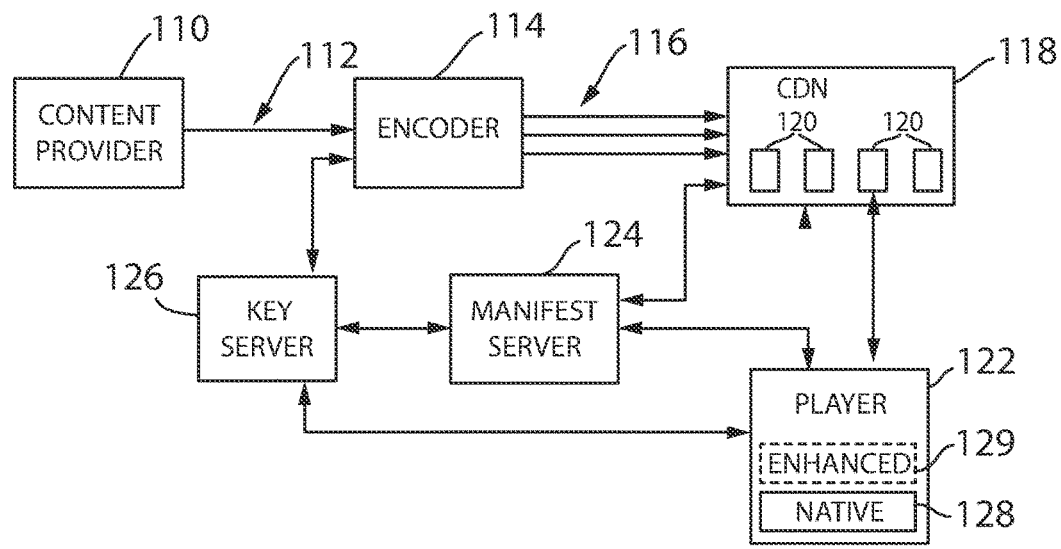
FIG. 1 is a block diagram representation of an environment incorporating the method for secure video manifest generation of the present disclosure.

In describing the various embodiments of the disclosure which are illustrated in the drawings, specific terminology will be resorted to for the sake of clarity. However, it is not intended that the disclosure be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

Turning initially to FIG. 1, one environment for providing secure manifest file generation and playback is illustrated. A content provider 110 generates a video signal 112 to be distributed to video consumers. The video signal may be provided in an uncompressed file format, such as a SDI format, or in a compressed format, such as an MPEG or TS file format. The video signal 112 is sent to an encoder 114 which converts the file into a live streaming signal 116. The live streaming signal 116 is preferably a segmented data stream that may be transmitted using standard HTTP or HTTPS protocol over the internet. The live streaming signal 116 may include multiple streams, where each stream may have a different data rate and/or different resolution. The format of the live streaming signal may be, but is not limited to, HLS or MPEG-DASH. Still other protocols such as HTTP Dynamic Streaming (HDS) from Adobe® or Microsoft® Smooth Streaming and the like may be used without deviating from the scope of the disclosure.

In addition to the segmented data stream, the encoder generates a manifest file. The manifest file contains information for a video player 122 to play the segmented data stream such as the data rate and resolution of each stream and a playlist providing an address from which the video content may be retrieved. The encoder 114 generates a single manifest file for each encoded video signal, where the manifest file is distributed along with the streaming signal 16 and stored on a CDN 118. It is noted that the "single" manifest file refers to a common or identical manifest file for each encoded signal. The manifest file may be comprised of multiple data files stored on the CDN where each data file contains information for a portion of the data required to playback the streaming signal. Further, for live streaming video, the manifest file may be updated and retransmitted at a periodic interval as new content is added from the live event. Although multiple files are used, the content of the manifest file generated by the encoder 114 for delivery to each video player 122 is the same. Each CDN 118 includes a number of edge servers 120 which store the encoded video signal 116 and manifest file until playback of the video content is requested by a video player 122. Although the embodiment illustrated in FIG. 1 shows a single CDN 118, it is contemplated that the encoded video signal 116 may be stored on multiple CDNs 118. The manifest file may include an address of each CDN such that playback may occur from any of the CDNs 118.

As further shown in FIG. 1, the illustrated environment includes a manifest server 124. The manifest server 124 is used to provide a unique manifest file, also referred to herein as a per-user manifest file, to each video player 122 for each requested video content. Each video player 122 includes a native video player module 128 which provides an interface to a user and which manages video playback on the device 122. Some video players 122 may further include an enhanced video player module 129, illustrated as an optional module in FIG. 1. The enhanced video player module 129 may be a plug-in or other software module executing on the video player 122 that either complements (i.e., adds additional capabilities) or replaces (i.e., adds additional capabilities and incorporates the video interface and playback capabilities) the native video player module 128. As will be discussed in more detail below, when a user 125 requests video content for playback on the video device 122, the native or enhanced video player module 129 communicates with a manifest server 124 rather than the CDN 118 to obtain the manifest files for video playback. The manifest server 124 manages the retrieval and delivery of the manifest file generated by the encoder 114 to provide the unique manifest file to each video player 122.

Figure 2:
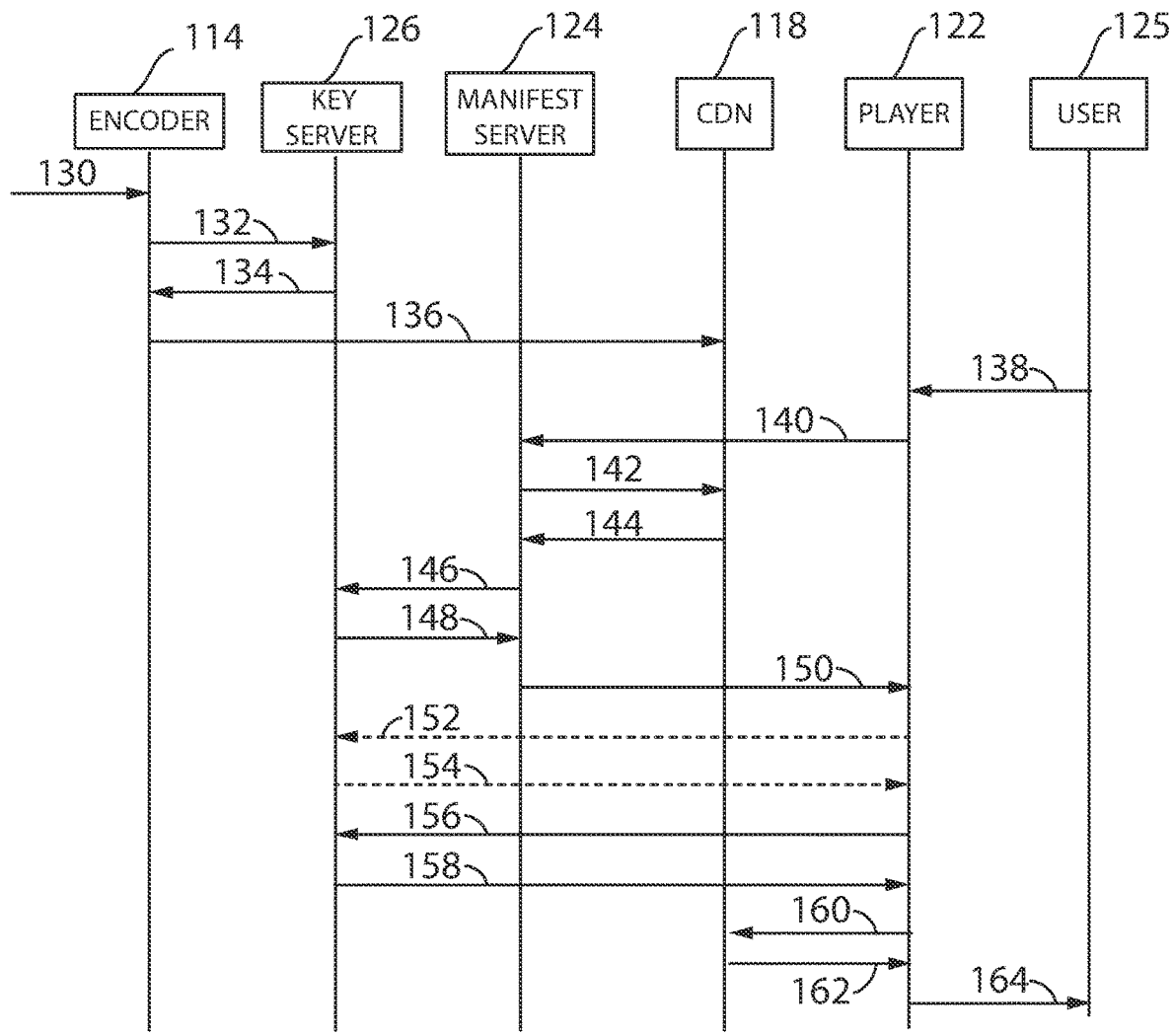
FIG. 2 is a flow diagram illustrating secure video manifest generation and playback according to one embodiment of the disclosure.

Turning next to FIG. 2, the operations performed to create, deliver, and playback video content according to a secure manifest file are illustrated. At block 130, the encoder 114 receives the initial video signal 112. It is contemplated that this video signal 112 may be a pre-recorded signal, such as an episode of a television show or a movie, or the video signal 112 may be a live stream, for example, of a sporting event, concert, or news feed. The encoder 114 converts the original video signal into a live streaming signal 116 suitable for delivery via HTTP or HTTPS. One step in converting the video signal is to divide the video signal into segments. The segments may be, for example, 10 seconds in length. Optionally, other segment lengths, for example, from 1 second up to 10 seconds may be selected. The length of the video segment must be less than the maximum payload for an HTTP data packet.

After converting the video signal 112 into segments, the encoder 114 encrypts the video signals 112 to prevent unauthorized viewing of the video content. At block 132, the encoder 114 establishes communication with a key server 126 and requests a key to use for encrypting the segmented video signal 112. The key server 126 returns a key to the encoder 114 as shown in block 134. The key used to encrypt the segmented video signal 112 will be referred to herein as the content encryption key. The encoder 114 may use any suitable encryption protocol, such as the Advanced Encryption Standard (AES), to encrypt the segmented video signal using the content encryption key. The location of the key server and the content encryption key used to encrypt the segmented video signal is included in a manifest file. The manifest file and the encrypted video signal are then transmitted to the CDN 118 for storage in one of the edge servers 120, as shown in block 136.

At block 138, a user 125 then requests playback of a desired video segment on the video player 122. The video player 122 may be any suitable electronic device to receive the streaming signal 16 such as a desktop computer, a television, a laptop computer, a tablet, Wi-Fi enabled device connected to a video screen, or a mobile phone. The video player 122 requests a manifest file from the manifest server 124 in order to retrieve the information necessary to play the requested video content. With reference also to FIGS. 4 and 5, segments of manifest files are illustrated that demonstrate a portion of the content that may be available in a manifest file. The manifest file is a text file and the particular content on each line of the text file is identified by the directive at the start of the line. For example, FIG. 3 identifies four different streams in the streaming signal 116 where each stream has a different bandwidth. The location of a playlist for each of the streams is also included in the manifest file. FIG. 5 is another manifest file which contains a portion of the playlist of an encrypted video segment. Each line begins with the location of the key server to decrypt the video segment, identifies a particular video segment between 1 and 5 (i.e., the "−1", "−2", etc. . . . prior to the .ts file extension), and provides the location of video segment in the CDN 118. The manifest file may include any information corresponding to the video stream, such as metadata information for the video stream.

When the video player 122 requests the manifest file from the manifest server 124 a connection is established between the devices. A session identifier is also generated to identify the connection. The session identifier may be generated by the video player 122 or the manifest server 124. For purposes of illustration, it will be assumed that the session identifier is generated by the video player 122. The session identifier is transmitted to the manifest server 124 by the video player 122 when requesting a manifest file. If the enhanced video player module 129 is present on the video player 122, the enhanced video player module 129 provides an indication to the manifest server 124 of its presence, for example, via a unique data packet format or an identifier set in the header or payload of the request for a manifest file. The manifest server 124 then requests the manifest file from the CDN 118 at block 142. At block 144, the CDN 118 returns the manifest file to the manifest server 124.

Because the manifest server 124 has established a connection with video player 122, it may customize the manifest file prior to returning the manifest file to the video player 122 and provide a unique manifest file to each video player 122. Without the manifest server 124, the video player 122 retrieves the manifest file directly from the CDN 118 and the content of the manifest file is the same for all users. However, because the manifest server 124 is providing a unique manifest file to each player, the manifest file may include identifying information of the video player 122, the user 125 of the video player, or a combination thereof. Further, the manifest file may be modified to include content specific for the user 125. Consequently, it may be desirable to encrypt the manifest file prior to transmitting it to the video player 122.

According to one embodiment of the disclosure, the manifest server 124 is configured to generate an encryption key for each manifest file. The encryption key is generated as a function of the unique session identifier generated by the video player 122 when it requested the desired video content. Optionally, the encryption key may also be generated as a function of the requested video content. As a result, each encryption key is unique to a specific session with a particular video player, resulting in a one-time use unique encryption key. The one-time use unique encryption key will be referred to herein as the manifest encryption key.

According to the embodiment illustrated in FIG. 2, the manifest server 124 transmits the manifest encryption key to the key server 126 at block 146. At block 148, the key server 126 acknowledges receipt of the manifest encryption key and stores the manifest encryption key for subsequent retrieval by the video player 122. The manifest server 124 may edit the manifest file to include the address of the key server 126 prior to delivering the manifest file to the video player 122.

According to another embodiment of the disclosure, the key server 126 may be configured to generate the manifest encryption key. At block 146, the manifest server 124 transmits the session identifier and an identifier corresponding to the desired video content to the key server rather than transferring the manifest encryption key. The key server 126 may then generate the manifest encryption key and, at block 148, return the manifest encryption key to the manifest server 124.

After generating or obtaining the manifest encryption key, the manifest server 124 may edit the manifest file prior to encryption. The address at which the video player 122 may retrieve the manifest encryption key is added to the manifest file.

Optionally, if the manifest server 124 has received an indication of the presence of the enhanced video player module 129, the manifest file may be encrypted without inserting the location of an encryption key. As discussed below, the enhanced video player module 129 may be configured to generate a duplicate encryption key on the video player module as a function of the session identifier and, therefore, transmission of the key is not required. After retrieval and editing, if necessary, of the manifest file, the manifest server 124 encrypts the manifest file with the manifest encryption key prior to transmitting the manifest file to the video player 122. The manifest server 124 then transmits the encrypted manifest file to the video player 122, as shown at block 150.

According to still another embodiment, the manifest server 124 or the key server 126 may generate a manifest encryption key as discussed above. The manifest server 124 server may store the manifest encryption key in the manifest file and include an encryption method to encrypt the manifest encryption key. The enhanced video player module 129 may include the same encryption method for subsequent decryption of the manifest encryption key.

Referring also to FIG. 5, an encrypted manifest file is illustrated. In the illustrated embodiment, the entire payload of the manifest file is encrypted. In the illustrated manifest file, the manifest encryption key is encrypted prior to being stored in the KEYREF field. Referring again to FIG. 1, if the video player 122 includes an enhanced video player module 129 from the provider of the manifest server 124, the enhanced video player module 129 may be configured to decrypt the encrypted manifest file directly. The manifest encryption key is encrypted in a manner known to both the manifest server 124 and the enhanced video player module 129. Therefore, the enhanced video player module 129 first decodes the manifest encryption key and then decodes the remainder of the manifest file using the manifest encryption key. If, however, the video player does not include an enhanced video player module 129 from the provider of the manifest server 124, the manifest server 124 may include an un-encrypted path to the key server 126, similar to that shown in FIG. 4, and the video player 122 requests the manifest encryption key from the key server 126 as shown in block 152. At block 154, the key server 126 returns the manifest encryption key to the video player 122, and the video player 122 decrypts the manifest file.

Having decrypted the manifest file, either directly on the video player 122 with an enhanced video player module 129 or by requesting the manifest encryption key from the key server 126 and then utilizing the native video player module 128 to decode the manifest file, either the enhanced video player module 129 or the native video player module 128 next needs to decode the video content. The video player module reads the location of the key server 126 for the content encryption key from the manifest file. It is contemplated that a single key server 126 may contain both the manifest encryption key and the content encryption key. Optionally, separate key servers 126 may be utilized for each of the encryption keys. The video player 122 requests the content encryption key from the key server 126 identified in the manifest file, as shown in block 156. At block 158, the key server 126 returns the content encryption key to the video player 122. The manifest file will have the address of the CDN 118 as containing the segmented video content. Therefore, the video player can then start retrieving the video content from the CDN. The video player 122 repeatedly requests the next segment in the playlist from the CDN 118 and the CDN returns the requested segment as shown by blocks 160 and 162. The native video player module 128 then decodes the content from the encrypted video segments and displays the requested video content to the user 125.

Portions of the disclosed embodiment are described herein as being implemented on various physical devices, including, but not limited to the video player 122, the manifest server 124, the key server 126, the encoder 114, or the edge server 120 within a CDN 118. It would be understood by one skilled in the art that these devices may include processing devices, such as a single microprocessor, multiple microprocessors, co-processors, application specific integrated circuits (ASICs), or other computing devices operating separately, in tandem, or a combination thereof. Further, each of these devices includes storage which may include transitory storage, non-transitory storage, or a combination thereof. The storage may include memory devices such as random access memory (RAM), read-only memory (ROM), solid state memory, and the like. The storage may further include devices configured to read removable storage medium such as CD-ROMs, DVDs, floppy disks, universal serial bus (USB) devices, memory cards, and the like. The processing devices may be configured to read and execute instructions stored in non-transitory storage to perform various operations in the methods described herein.

It should be understood that the disclosure is not limited in its application to the details of construction and arrangements of the components set forth herein. The disclosure is capable of other embodiments and of being practiced or carried out in various ways. Variations and modifications of the foregoing are within the scope of the present disclosure. It also being understood that the disclosure disclosed and defined herein extends to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure.

What is claimed is:

1. A method for secure delivery of a manifest file for use in playback of a video signal on a video player, the method comprising:
    establishing a connection with the video player, wherein the connection has a session identifier identifying the connection with the video player;
    receiving a request from the video player for the video signal, wherein the video signal is associated with the manifest file created for the video signal;
    customizing, using the session identifier identifying the connection with the video player, the manifest file created for the video player to provide a customized manifest file that is unique to the video player, the customized manifest file to be used in playback of the video signal on the video player;
    encrypting the customized manifest file using a manifest encryption key which is based on the session identifier identifying the connection with the video player; and
    transmitting the encrypted manifest file to the video player.

2. The method of claim 1 further comprising retrieving the manifest file from a content delivery network after receiving the request for the video signal from the video player.

3. The method of claim 1 further comprising:
    receiving an indication of the video player's ability to decrypt an encrypted manifest encryption key locally; and
    providing the encrypted manifest encryption key with the encrypted manifest file to the video player without providing a location of a key server that stores data associated with the manifest encryption key.

4. The method of claim 1 further comprising:
    receiving an indication of the video player's ability to decrypt an encrypted manifest encryption key locally; and
    providing the encrypted manifest encryption key and the encrypted manifest file to the video player with the location of a key server that stores data associated with the manifest encryption key.

5. The method of claim 1 wherein establishing the connection with the video player further comprises:
    receiving an initiate connection request from the video player;
    generating the session identifier corresponding to the connection with the video player on a manifest server; and
    sending an acknowledgement of the connection request to the video player.

6. The method of claim 1 wherein the session identifier is a unique identifier generated by the video player for the connection with a manifest server, and wherein the session identifier corresponds to the requested video signal, the method further comprising receiving the session identifier from the video player at a manifest server.

7. The method of claim 1 wherein the manifest file is created by an encoder and distributed to a content delivery network along with the video signal for storage on one or more of a plurality of edge servers of the content delivery network.

8. The method of claim 1 wherein the customized manifest file comprises the session identifier identifying at least one of the video player or a user of the video player.

9. A system to provide secure delivery of a manifest file for use in playback of a video signal on a video player, the system comprising:
    a memory; and
    a processor, coupled to the memory, to perform operations comprising:
    establishing a connection with the video player, wherein the connection has a session identifier identifying the connection with the video player;
    receiving a request from the video player for the video signal, wherein the video signal is associated with the manifest file created for the video signal;
    customizing, using the session identifier identifying the connection with the video player, the manifest file created for the video player to provide a customized manifest file that is unique to the video player, the customized manifest file to be used in playback of the video signal on the video player;
    encrypting the customized manifest file using a manifest encryption key which is based on the session identifier identifying the connection with the video player; and
    transmitting the encrypted manifest file to the video player.

10. The system of claim 9, the operations further comprising retrieving the manifest file from a content delivery network after receiving the request for the video signal from the video player.

11. The system of claim 9, the operations further comprising:
    receiving an indication of the video player's ability to decrypt an encrypted manifest encryption key locally; and
    providing the encrypted manifest encryption key with the encrypted manifest file to the video player without providing a location of a key server that stores data associated with the manifest encryption key.

12. The system of claim 9, the operations further comprising:
    receiving an indication of the video player's ability to decrypt an encrypted manifest encryption key locally; and
    providing the encrypted manifest encryption key and the encrypted manifest file to the video player with the location of a key server that stores data associated with the manifest encryption key.

13. The system of claim 9 wherein establishing the connection with the video player further comprises:

receiving an initiate connection request from the video player;

generating the session identifier corresponding to the connection with the video player on a manifest server; and sending an acknowledgement of the connection request to the video player.

14. The system of claim 9 wherein the session identifier is a unique identifier generated by the video player for the connection with a manifest server, and wherein the session identifier corresponds to the requested video signal, the method further comprising receiving the session identifier from the video player at a manifest server.

15. The system of claim 9 wherein the manifest file is created by an encoder and distributed to a content delivery network along with the video signal for storage on one or more of a plurality of edge servers of the content delivery network.

16. The system of claim 9 wherein the customized manifest file comprises the session identifier identifying at least one of the video player or a user of the video player.

17. A non-transitory machine-readable medium comprising instructions, which when performed by a processor, cause the processor to perform operations to provide secure delivery of a manifest file for use in playback of a video signal on a video player, the operations comprising:

establishing a connection with the video player, wherein the connection has a session identifier identifying the connection with the video player;

receiving a request from the video player for the video signal, wherein the video signal is associated with the manifest file created for the video signal;

customizing, using the session identifier identifying the connection with the video player, the manifest file created for the video player to provide a customized manifest file that is unique to the video player, the customized manifest file to be used in playback of the video signal on the video player;

encrypting the customized manifest file using a manifest encryption key which is based on the session identifier identifying the connection with the video player; and transmitting the encrypted manifest file to the video player.

18. The non-transitory machine-readable medium of claim 17, the operations further comprising retrieving the manifest file from a content delivery network after receiving the request for the video signal from the video player.

19. The non-transitory machine-readable medium of claim 17, the operations further comprising:

receiving an indication of the video player's ability to decrypt an encrypted manifest encryption key locally; and providing the encrypted manifest encryption key with the encrypted manifest file to the video player without providing a location of a key server that stores data associated with the manifest encryption key.

20. The non-transitory machine-readable medium of claim 17, the operations further comprising:

receiving an indication of the video player's ability to decrypt an encrypted manifest encryption key locally; and providing the encrypted manifest encryption key and the encrypted manifest file to the video player with the location of a key server that stores data associated with the manifest encryption key.

21. The non-transitory machine-readable medium of claim 17 wherein establishing the connection with the video player further comprises:

receiving an initiate connection request from the video player;

generating the session identifier corresponding to the connection with the video player on a manifest server; and sending an acknowledgement of the connection request to the video player.

22. The non-transitory machine-readable medium of claim 17 wherein the session identifier is a unique identifier generated by the video player for the connection with a manifest server, and wherein the session identifier corresponds to the requested video signal, the method further comprising receiving the session identifier from the video player at a manifest server.

23. The non-transitory machine-readable medium of claim 17 wherein the customized manifest file comprises the session identifier identifying at least one of the video player or a user of the video player.

* * * * *